United States Patent
Vaupot et al.

(10) Patent No.: US 11,534,023 B2
(45) Date of Patent: Dec. 27, 2022

(54) COOKING DEVICE AND COOKING METHOD

(71) Applicant: KONINKLIJKE PHILIPS N.V., Eindhoven (NL)

(72) Inventors: Jan Vaupot, Eindhoven (NL); Stefan Hans Sauer, Eindhoven (NL); Christian Mikula, Eindhoven (NL); Christian Egger, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/621,735

(22) PCT Filed: Jun. 26, 2020

(86) PCT No.: PCT/EP2020/068105
§ 371 (c)(1),
(2) Date: Dec. 22, 2021

(87) PCT Pub. No.: WO2021/004816
PCT Pub. Date: Jan. 14, 2021

(65) Prior Publication Data
US 2022/0202236 A1    Jun. 30, 2022

(30) Foreign Application Priority Data

Jul. 5, 2019  (EP) .................................... 19184762

(51) Int. Cl.
*A47J 36/32*    (2006.01)
*A47J 37/06*    (2006.01)
(Continued)

(52) U.S. Cl.
CPC ............. *A47J 36/32* (2013.01); *A47J 36/321* (2018.08); *A47J 37/0629* (2013.01);
(Continued)

(58) Field of Classification Search
CPC ................ A47J 37/0642; A47J 37/0623; A47J 37/0754; A47J 36/321; A47J 37/0641; F24C 7/087; F24C 7/08
See application file for complete search history.

(56) References Cited

U.S. PATENT DOCUMENTS 4,818,547 A    4/1989  Miwa et al.
4,998,001 A    3/1991  Cigarini et al.
(Continued)

FOREIGN PATENT DOCUMENTS

DE         19609116 A1    9/1997
DE      102007040316 A1    2/2009
(Continued)

OTHER PUBLICATIONS

Extended European Search Report issued in connection with corresponding EP Application No. 19184762.3 dated Dec. 16, 2019.
(Continued)

*Primary Examiner* — Reginald Alexander
(74) *Attorney, Agent, or Firm* — Maschoff Brennan (57) ABSTRACT

A cooking device is for cooking food on a support (e.g. in a basket) within a cooking chamber. A required cooking time is determined based only on the time-evolution of the cooking chamber temperature and a power of the heating device. A first, less accurate, estimate of the required cooking time is determined within a first period, e.g. 90 seconds, of the turning on of the heating device and a second, more accurate, estimate of the required cooking is determined later, but e.g. within five minutes of the turning on of the heating device.

16 Claims, 6 Drawing Sheets

(51) Int. Cl.
*A47J 37/12* (2006.01)
*F24C 7/08* (2006.01)

(52) U.S. Cl.
CPC ....... *A47J 37/0641* (2013.01); *A47J 37/0664* (2013.01); *A47J 37/1266* (2013.01); *F24C 7/087* (2013.01); *A47J 37/0623* (2013.01); *F24C 7/08* (2013.01)

(56) References Cited

U.S. PATENT DOCUMENTS

| | | | |
|---|---|---|---|
| 5,237,142 | A | 8/1993 | Cigarini et al. |
| 5,247,146 | A | 9/1993 | Civanelli et al. |
| 6,111,239 | A | 8/2000 | Park |
| 6,396,035 | B2 | 5/2002 | Shon et al. |
| 6,759,635 | B2 | 7/2004 | Lile |
| 10,194,770 | B2 | 2/2019 | Young et al. |
| 10,561,277 | B1 * | 2/2020 | Swayne ............... A47J 37/0641 |
| 2011/0305810 | A1 | 12/2011 | Owensby et al. |
| 2012/0100269 | A1 | 4/2012 | Polt |
| 2016/0174748 | A1 | 6/2016 | Baldwin et al. |
| 2017/0016623 | A1 * | 1/2017 | Rabie .................. A47J 37/0629 |
| 2017/0150842 | A1 | 6/2017 | Young et al. |

FOREIGN PATENT DOCUMENTS

| | | |
|---|---|---|
| EP | 0701387 A2 | 3/1996 |
| EP | 1835371 A1 | 9/2007 |
| EP | 1927810 A1 | 6/2008 |
| EP | 2769598 B1 | 6/2017 |
| WO | 2015135788 A1 | 9/2015 |
| WO | 2015185404 A1 | 12/2015 |

OTHER PUBLICATIONS

International Search Report and Written Opinion issued in connection with corresponding PCT Application No. PCT/EP2020/068105 dated Oct. 22, 2020.

* cited by examiner

COOKING DEVICE AND COOKING METHOD

CROSS-REFERENCE TO RELATED APPLICATIONS

The present application is a U.S. National Phase application under 35 U.S.C. § 371 of International Application No. PCT/EP2020/068105, filed on Jun. 26, 2020, which claims the benefit of European Patent Application No. 19184762.3, filed on 5 Jul. 2019. These applications are hereby incorporated by reference herein.

FIELD OF THE INVENTION

This invention relates to a cooking device and method which estimates the time required for a cooking process to be complete.

BACKGROUND OF THE INVENTION

Current cooking devices are mostly controlled by user's selection of parameters such as time and temperature. Automatic selection of these cooking parameters would be convenient to the user and could also improve the cooking results by eliminating human error.

In order to control a cooking process accurately, it is necessary to know the key properties of the food during cooking. In particular, these key properties should allow the "doneness" to be measured or predicted during cooking. For example, the core temperature of a food item changes as the food is cooked. The core temperature of the food is a fundamental measurement of cooking doneness: for a certain type of food, it should be higher than a certain value to kill the harmful bacteria that cause foodborne illness but should not be too high in order to avoid overcooking. As a result, to ensure safety, foods are suggested to be cooked for an appropriate period of time and with a suitable internal temperature (range).

To determine if an item of food is cooked based on the core temperature, invasive methods are possible, but these will cause damage to the food when detecting core temperature. Non-invasive methods such as infrared sensing have limited penetration ability so are usually used to detect the surface temperature.

It has also been proposed to monitor a temperature of the cooking medium (rather than the actual food core temperature) over time and monitor a mass of an item to be cooked over time. The mass and temperature information can be used to provide an estimation of the current food core temperature. The cooking process can then be controlled in dependence on the predicted food core temperature.

This approach is disclosed in WO 2015/185404.

This approach, and other known approaches, provide a way to measure the "doneness" during cooking.

One issue is that the measurement of doneness often needs many different sensing approaches, and also it can take a long time to track the doneness in such a way that a reliable estimate of the remaining cooking time can be obtained.

DE 10 2007 040316 discloses a system and method for displaying a remaining cooking time, based on monitoring of food core temperature. A first indication is based on user input only, and then the cooking chamber temperature and food core temperature are monitored to provide an estimate of the remaining cooking time.

There is therefore a need for a monitoring approach which enables doneness estimation to be performed with reduced complexity and which can quickly provide information to a user regarding the remaining cooking time.

SUMMARY OF THE INVENTION

The invention is based on determining a required cooking time only using the time-evolution of the cooking chamber temperature and a power of the heating device. A first, less accurate, estimate of the required cooking time is determined within an initial time period from the turning on of the heating device and a second, more accurate, estimate of the required cooking is determined later.

The invention is defined by the claims.

According to the invention, there is provided a cooking device, comprising:

a cooking chamber;

a food support for supporting the food to be cooked, for mounting in the cooking chamber;

a heating device for heating the cooking chamber;

a sensing arrangement comprising a cooking chamber temperature sensor;

an output device; and a controller adapted to:

generate a first estimate of the required cooking time for a given food item to be cooked, after a first time period from the turning on of the heating device, wherein the first estimate is based only on the time-evolution of the cooking chamber temperature and a power of the heating device;

generate a second estimate of the required cooking time for the given food item to be cooked by a continuous cooking cycle, after a second time period longer than the first time period, wherein the second estimate is again based only on the time-evolution of the cooking chamber temperature and a power of the heating device; and control the output device to present the first and then second estimate to a user.

This cooking device enables determination of a required cooking time using a simple arrangement with only temperature changes over the cooking time being monitored. There is no need for weight sensing, humidity sensing or imaging sensing. There is also no need for food core temperature sensing. The determined required cooking time is presented to a user. A first (less accurate) estimate is provided after a short period of time and this is updated with a second (more accurate) estimate later, in particular when a longer evolution of temperature information is available. The determined required cooking time may optionally also be used for an automatic cooking cycle.

By "based only on the time-evolution" is meant that the estimation uses time values and associated temperature values, and hence information which may be derived from a temperature versus time graph. Thus, there is timing information and temperature information.

By "for a given food item to be cooked" is meant that information about the food item may also be taken into an account. For example, a user may identify the "given food item", and this then maps to associated algorithms for generating the first and second estimates.

By "a continuous cooking cycle" is meant that the time estimate applies for a continuous cooking cycle. If the cooking cycle is interrupted, for example to stir or shake the food to be cooked, the estimate may then be invalidated and a new estimate is needed.

The first time period is for example 90 seconds or less, and the second time period is 5 minutes or less. The user thus does not need to wait long for an initial estimate of the cooking time, and can check for a more accurate estimate later, at their leisure.

The first and second estimates are preferably the only cooking time estimates for a given continuous cooking cycle. Thus, the user is not bombarded with differing and conflicting information.

The information presented to the user is instead kept simple, with an initial rough estimate, and a later more accurate estimate. Only if the cooking cycle is interrupted a new (third, etc.) estimate is then required.

The cooking device may further comprise a power measurement system for measuring a power delivery of the heating device.

One approach is to use the known default power level of the heater. However, a more accurate approach is to measure the power delivery, for example by monitoring the current and voltage of the heater. This may be carried out only once during an initial period of heating, for example an average heating power during a period of e.g. 10 seconds within an initial time after the heater is first turned on (e.g. within the first 30 seconds). The average heating power may be derived after an initial settling period. The evolution of the heating power over time is not needed. In particular, the second estimate may be obtained after a continuous period of activation of the heating device.

The cooking device may further comprise a user interface for receiving from a user information relating to the type of the food item to be cooked and identifying the given food item to be cooked.

Different time estimation algorithms may be used for different food types. The user information may involve a selection of both a food type and food status (e.g. fresh or frozen) but preferably as a single user selection (e.g. frozen chips is one option and fresh chips is another option). Thus, a single user selection may be all that is required.

The controller may be further adapted to:

change the heating device output power after a predefined heating time or when a predefined temperature is reached, for an interrupt period before generating the second estimate.

This interruption gives additional information about the evolution of temperature, for example how temperature evolves during cooling for a brief period (e.g. an interruption of tens of seconds such as 20 seconds). This means the time-evolution of cooking temperature conveys more information, which may for example enable a mass of the food being cooked to be taken into account more accurately. This helps to make the second estimate more accurate than the first.

The controller is for example adapted to change the heating device output power to zero for the interrupt period.

The cooking device may further comprise a fan for circulating air in or through the cooking chamber, and wherein the controller is further adapted to change the fan speed after a predefined heating time or when a predefined temperature is reached, for an interrupt period before generating the second estimate.

The interrupt may thus involve a period of different fan drive conditions.

The controller is for example adapted to:

generate the first estimate based on the evolution of the cooking chamber temperature during the first time period and the heating device power delivery; and generate the second estimate based on the evolution of the cooking chamber temperature during the second time period and the heating device power delivery.

The second estimate is more accurate at least because it makes use of time-evolution information over a longer time period. The estimates may for example be obtained based on the application of the cooking chamber temperature measurements and heating power delivery to an equation. The equation may be derived by machine learning, with different equations applying to the first estimate and the second estimate and for different types of food to be cooked.

The cooking device for example comprises an air fryer.

The cooking device may further comprise:

a sensor for sensing an intervention made by a user to the food during cooking, wherein the controller is adapted to:

perform a further estimate of the required cooking time, in response to, and following, a sensed intervention; and/or implement a manual cooking mode if an intervention is made by the user before the second estimate can be made of the required cooking time.

In this way, if a user performs an intervention, such as shaking or stirring the food being cooked, the time estimate is recalculated, to maintain an accurate indication of the remaining cooking time. Thus, the continuous cooking cycle for which the second estimate was valid is no longer being followed, and an updated estimate is appropriate.

The controller is for example adapted to implement an automatic cooking mode, with a cooking time based on the second estimate. Thus, the cooking is automatic, but the user is also given information about the remaining cooking time.

The invention also provides a cooking method, comprising:

sensing a cooking chamber temperature of a cooking device having a food support for supporting the food to be cooked mounted in the cooking chamber;

generating a first estimate of the required cooking time for a given food item to be cooked, after a first time period from the turning on of the heating device, wherein the first estimate is based only on the time-evolution of the cooking chamber temperature and a power of the heating device;

generating a second estimate of the required cooking time for the given food item to be cooked by a continuous cooking cycle, after a second time period longer than the first time period, wherein the second estimate is again based only on the time-evolution of the cooking chamber temperature and a power of the heating device; and presenting the first and then second estimate to a user.

The method may comprise:

changing the heating device output power after a predefined heating time or when a predefined temperature is reached, for an interrupt period before generating the second estimate; and/or changing a fan speed after a predefined heating time or when a predefined temperature is reached, for an interrupt period before generating the second estimate.

The invention also provides a computer program comprising code means which is adapted, when run on a computer, to perform the steps of the method.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention provides a cooking device again for cooking food on a support (e.g. in a basket) within a cooking chamber. A required cooking time is determined based only on the time-evolution of the cooking chamber temperature and a power of the heating device. A first, less accurate, estimate of the required cooking time is determined within 90 seconds of the turning on of the heating device and a second, more accurate, estimate of the required cooking is determined later, but within five minutes of the turning on of the heating device.

The invention is for example of interest for application to an air fryer.

Figure 1:
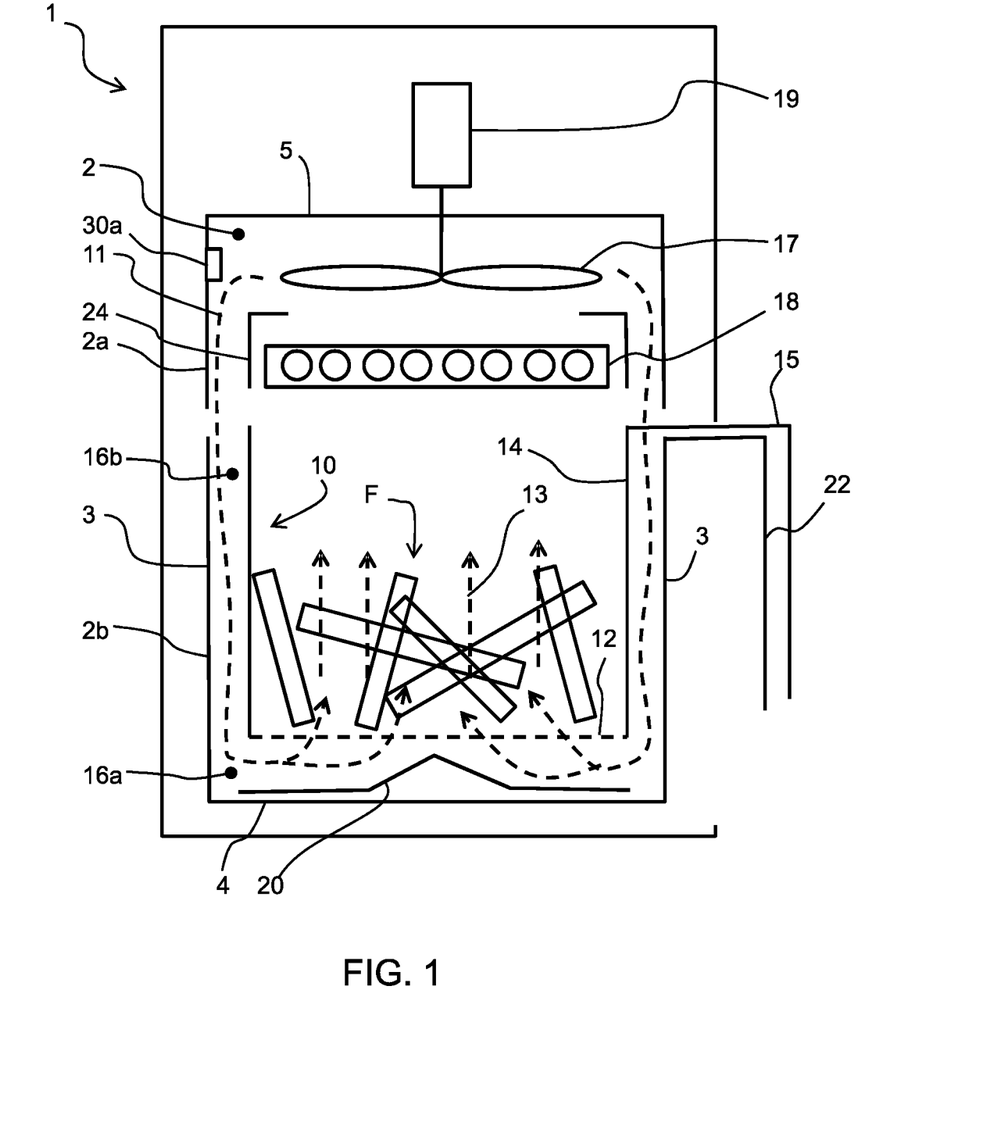
FIG. 1 shows a known cooking device.

FIG. 1 shows a known design of air-based fryer 1 in cross-sectional view. The air-based fryer 1 comprises a cooking chamber 2 with sidewalls 3, a bottom wall 4 and a top wall 5. A food support in the form of a basket 10 is disposed within the cooking chamber 2 to support food F to be cooked.

The basket 10 comprises an air-permeable bottom 12 and solid side walls 14. It has an open top, although a permeable cover plate may also be provided. The bottom 12 for example comprises a wire mesh which is a snap fit into the base of the basket within the side walls 14. The wire mesh is for example removable for cleaning, e.g. in a dishwasher, whereas the remainder of the basket is typically wiped clean by the user.

A mounting structure 15 is provided to detachably mount the basket 10 in the cooking chamber 2. The mounting structure 15 is designed to allow air to circulate all around the basket 10 in the mounted condition. The mounting structure 15 is designed such that in the mounted condition a bottom gap 16a is provided between the air-permeable bottom 12 and the bottom wall 4 of the cooking chamber 2. Furthermore, a lateral gap 16b is provided between the sidewalls 3 of the cooking chamber 2 and the perimeter of the air-permeable bottom 12. The bottom gap 16a and lateral gap 16b together form part of an air circulation channel.

The mounting structure 15 is designed to minimize obstruction of said air circulation channel.

In some embodiments, as illustrated in FIG. 1, the mounting structure 15 comprises a handle, with which the basket 10 may be suspended from a sidewall 3 of the cooking chamber 2. The handle allows a user to easily remove the basket 10 from the cooking chamber 2.

The air-based fryer 1 further comprises an air circulation system comprising a fan 17, a motor 19 and an air heater 18 for circulating hot air in the cooking chamber 2. The air heater 18 may be disposed above the basket 10. In such a case, the air heater 18 may radiate heat directly to the food ingredients F in addition to heating the air in the cooking chamber 2.

The air circulation system may also be disposed above the basket 10 for example above the air heater 18.

The air circulation system is designed to pass hot air through the air-permeable bottom 12 of the basket 10 such that food F disposed thereon will be prepared by a through-streaming of hot air.

The air circulation system in this example is designed to draw air upward through the basket 10 as shown by arrows 13. The air may subsequently be passed along the air heater 18 to heat the air. The air heater 18 may be any appropriate heating source, such as an electric heater which can heat air to, for example, between roughly 100° C. and 250° C. by controlling the power supplied to the air heater.

As shown by arrows 11, the air circulation system is designed to pass hot air downward along an inner surface of the cooking chamber 2 and an outer surface of the basket 10. The bottom gap 16a and lateral gap 16b together form an air circulation channel for guiding the flow of hot air from the air circulation system to the bottom 12 of the basket 10.

The bottom wall 4 of the cooking chamber 2 may be flat or as shown in FIG. 1 the bottom wall 4 may be provided with an air guide member 20 configured to direct the hot air flow towards and/or through the air-permeable bottom 12 of the basket 10.

The air guide member 20 may have a substantially conical, or frusto-conical outer contour or it may comprise ribs or arms. The air guide member 20 may be integrally formed in the bottom wall 4 of the cooking chamber or be provided as a separate insert.

In the example shown, a deflector plate 24 is provided in an upper part of the cooking chamber 2 above the basket 10, to further enclose a volume enclosed by the basket 10, and to help guiding air from the air circulation system around the basket into the air circulation channel formed by the bottom gap 16a and lateral gap 16b.

The cooking chamber 2 is shown with an upper section 2a and a lower section 2b, separable from each other to enable access into the cooking chamber 2. The upper section 2a thus functions as a cooking chamber lid. In some embodiments, the lower section 2b may be arranged stationary and the upper section 2a may be releasably or hingedly arranged, e.g. in the form of a lid. In some embodiments, the upper section 2a may be arranged stationary and the lower section 2b may be releasably arranged, e.g. in the form of a drawer. In such case, the lower section 2b may comprise a handle 22 to aid removal of the lower section 2b from the air-based fryer 1, as illustrated in FIG. 1. The handles 15 and 22 couple together to define a single handle for the user to manipulate.

The air-based fryer 1 may comprise a vent (not shown), defining an air outlet from the cooking chamber 2 to outside the air-based fryer 1.

In use, a variety of food types may be prepared in the air-based fryer 1. In the case where the food is a bulk type of food, the individual food ingredients F may form a pile as illustrated in FIG. 1, with the height, density and consequently the flow resistance being highest in the center of the pile and decreasing towards the periphery.

The bottom 12 of the basket 10 may for example be designed to have a flow resistance that reversely mirrors the flow resistance of the pile, so is lowest in the center and increases towards the periphery. Thus, the total flow resistance of the bottom 12 and pile together may be more or less constant over the entire cross section of the basket 10, resulting in a more homogeneous air flow through the basket 10 and, ultimately, in more homogeneous cooking results.

The heater is controlled by a controller (not shown in FIG. 1) which is provided with temperature information from a temperature sensor 30a, so that there is feedback control of the heating process.

The invention may be applied to different types of cooking device, including the air fryer design of FIG. 1, other air fryer designs, or indeed other types of cooking device.

The invention relates more generally to a cooking device having a cooking chamber, a food support for supporting the food to be cooked for mounting in the cooking chamber, and a heating device for heating the cooking chamber.

A first aspect of this disclosure relates to the detection of an interruption to the cooking cycle.

Figure 2:
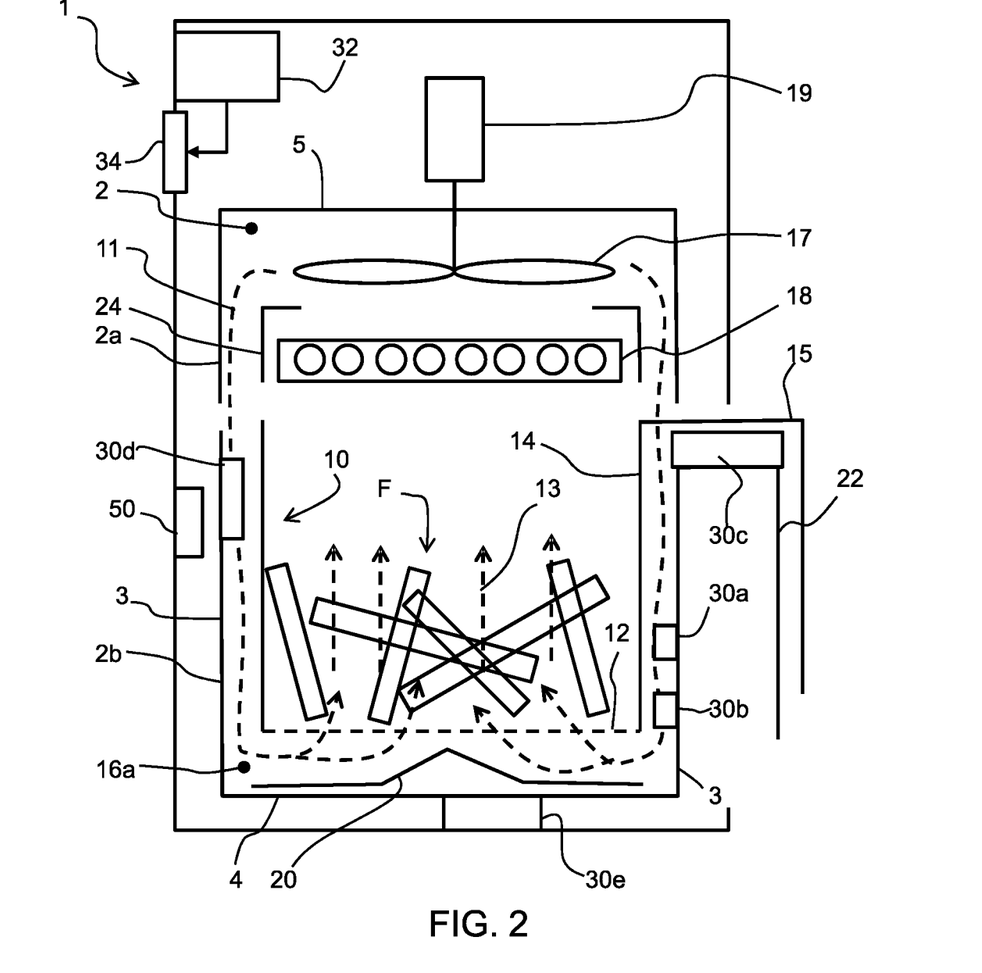
FIG. 2 shows a cooking device as a modification to the cooking device of FIG. 1.

FIG. 2 shows how the cooking device of FIG. 1 is modified in accordance with this first aspect.

The cooking device further comprises a sensing arrangement for sensing cooking parameters over time. By way of example, the cooking parameters may comprise one or more of:

the cooking chamber temperature measured by a temperature sensor 30a in the cooking chamber (or a set of temperature sensors at multiple locations in the cooking chamber). Note that this may be the existing temperature sensor used for feedback control of the heating process, or there may be one or more additional dedicated sensors; the humidity measured by a humidity sensor 30b in the cooking chamber (or a set of humidity sensors at multiple locations in the cooking chamber);

the food weight determined by a weight sensor 30c for weighing the basket;

the food color (or related appearance characteristics) monitored by an image sensor 30d;

the food weight determined by a weight sensor 30e for weighing the basket and the cooking chamber 2.

Note that any combination of sensors may be used for this aspect. Any one may be used in isolation, or any combination of different sensing modalities may be used. Preferred combinations for example comprise temperature and weight monitoring, humidity and weight monitoring, humidity and temperature monitoring. Any combination of two, or three of the sensing modalities may be used, and all four may also be used.

A controller 32, typically implemented as a microprocessor, is adapted to determine a required cooking time for the food to be cooked based on the time-evolution of the one or more sensed cooking parameters. It receives the sensing signals from the sensing arrangement 30a, 30b, 30c, 30d, 30e, although these signal paths are not shown in FIG. 2.

The function used to determine the cooking time will depend on the sensing modalities used, and may be based on machine learning or else using equation-based modelling of the cooking characteristics. Look up tables may instead be used. Essentially, any mapping between the sensed parameters over time and the estimated remaining cooking time may be used. The time-evolution of the parameters is for example monitored over a measurement time period. From the data obtained, a function can be fitted to the data, and this can be extrapolated to the future. The function may for example represent the food core temperature, and a target core temperature corresponds to the completion of the cooking process. The function may be a linear approximation or a higher order function. However, there may instead be a target humidity level, a target image characteristic (e.g. color) or other target condition which represents the completion of the cooking process.

The controller 32 controls a panel 34 which functions as a user interface for receiving user commands and displaying output to the user.

Figure 3:
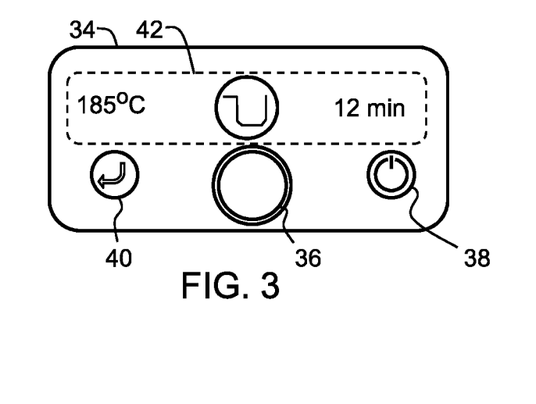
FIG. 3 shows an example of a user interface panel.

As shown in FIG. 3, the panel 34 for example has a rotary control knob 36, an on/off button 38, a select button 40 (for selecting an option selected by the knob 36) and a display 42. The display for example has a region for displaying a cooking temperature setting, a time remaining of the cooking process, and a symbol to indicate that it is time to shake the food, i.e. remove the basket from the chamber and shake the contents, to achieve a better overall cooking process. Thus, an output instruction is provided to a user to perform the intervention at a particular time. This may be a visual as well as an audible output.

Of course other displayed content may be provided such as a food type (fish, meat, vegetables, chips). The user may input the type of food and also a fresh or frozen status.

Returning to FIG. 2, the cooking device also has a sensor 50 for sensing an intervention made by a user to the food during cooking. This sensor may detect opening of a lid or removal of a drawer. In either case, it senses when the basket is removed. The sensor is shown as a separate dedicated 50 sensor in FIG. 2, but instead one or more of the sensors 30a, 30b, 30c, 30d may be used, as discussed further below.

The controller 32 re-determines the required cooking time, based on the time-evolution of the sensed cooking parameters, in response to, and following, a sensed intervention.

In this way, the cooking device determines a cooking time based on the evolution of cooking parameters, such as one or more of chamber temperature, food core temperature, humidity level, food weight, image characteristics, etc. By sensing an intervention, such as shaking the food ingredients, the cooking time can be re-calculated to take account of that intervention. Thus, the indication remains accurate and/or the automated cooking process remains reliable. The cooking time determination thus does not need to take place continuously, thereby saving time and processing. Instead, the remaining time determination takes place at discrete times, in particular at the start of the cooking process and on completion of one or more sensed interventions.

It is known that the time evolution of cooking parameters may be used to determine a remaining cooking time.

A first possible approach is to monitor the food core temperature, using a probe, over time. This is based on an analysis of the heat transfer function between the air in the cooking chamber and the food as the food heats and is cooked. For example, by monitoring the temperature at a set of time intervals, a function can be obtained by interpolation between those values, and the end cooking time can be obtained by extrapolation of that function. The cooking process is for example complete when the food core reaches a particular temperature.

A system based on this approach is for example described in EP 1 835 371 to which reference is made. However, this requires a temperature probe to be inserted into a part of the food.

An alternative is to monitor one or more cooking chamber temperatures, and to estimate the core temperature from these external temperature measurements. By way of example, the additional monitoring of food weight may enable an accurate estimation to take place. The weight sensor 30c for example monitors the weight of the basket and the food to be cooked, or even the whole cooking appliance (in which case it can be external to the cooking chamber). The weight sensor 30c may be implemented as a pressure sensor.

The controller 34 processes the weight sensor and temperature sensor information to provide a prediction of the food core temperature and to determine the cooking time by extrapolating the predicted food core temperature.

Core temperature prediction can in this way be achieved using parameters that can be easily obtained in the cooking system. There may be other parameters monitored, including humidity. For example, the parameters may comprise a combination of air temperature, or air temperature rate of change, a surface temperature of food, a rate of change of the surface temperature of food, weight of food, weight loss rate of food, moisture content of food, the rate of change of moisture content, the humidity of the surrounding air, the rate of change of humidity etc.

These parameters can be detected, determined or estimated without invasion or destruction of food.

The relationship between the core temperature and the full set of monitored parameters is first established, then the core temperature can be predicted by that relationship. The predicted core temperature can then be employed to judge the cooking status of the food and as a result can be used to control the process and derive the remaining cooking time.

This approach is described in more detail in WO 2015/185404.

It is also known to determine a level of doneness of food based (only) on humidity sensing, as described in EP 0 701 387. The moisture content in the cooking cavity evolves over time. EP 0 701 387 discloses the use of a neural network to learn how the humidity function maps to the doneness of the food.

This invention may use any of these known approaches, or a combination of approaches to provide an estimation of a level of doneness of a food, and to predict the future function of doneness over time, so that an estimate may be made of the remaining cooking time.

The estimation may make use of any combination of chamber temperature sensing, food surface temperature sensing, food core temperature sensing with a probe, chamber humidity sensing, food weight sensing and food image analysis.

This aspect does not relate specifically to the estimation of doneness or prediction of future doneness since known approaches may be used as have been identified and discussed above.

A first feature is to provide an indication to a user of when to perform an intervention, typically a shaking function for the basket. A particular time is set at which user intervention is needed, and an output is generated for the user. This may for example be half way through the cooking time, as determined from the estimation of the total cooking time. More generally, the intervention time may be a time point between one third and two thirds of the way through the determined required cooking time. The intervention may be a set point in time through the cooking process, or it may be based on the monitoring of the cooking parameters, but this will still generally result in a time point between one third and two thirds of the way through the cooking process.

A second feature is that the intervention itself is sensed by the sensor 50 (or one or more of the sensors 30a, 30b, 30c, 30d as described below). The intervention sensed may be the opening of the chamber (for removal of the basket or manipulation of the food on the support) or actual removal of the basket (for shaking).

The intervention time does not need to be a particular fraction of the cooking time, as mentioned above.

As one example, if the sensing (for cooking time determination) includes humidity sensing, the time for the intervention may be set as the point in time at which the humidity reaches a certain level. This may be just before the food starts to lose water rapidly. By opening the cooking chamber (e.g. drawer or lid), the humidity in the cooking chamber drops sharply. The humidity monitoring itself may thus be used as the sensing mechanism for sensing the intervention.

Figure 4:
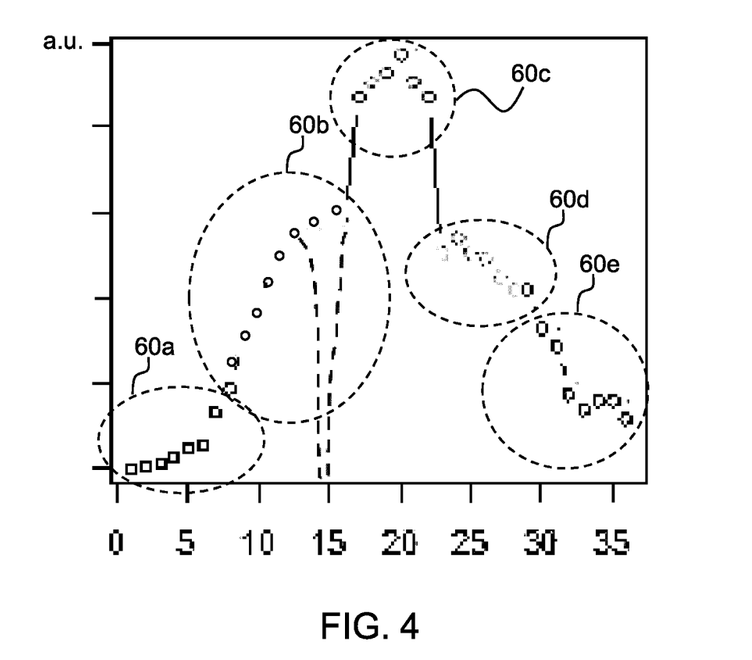
FIG. 4 shows the dependency of the humidity (y-axis) with time during cooking.

FIG. 4 shows the dependency of the humidity (y-axis in arbitrary units) with time (illustrated as number of 30 second cooking cycles, x-axis). The dotted line shows the effect of an intervention at about 12 cycles. The regions 60a to 60e represent different doneness phases during the cooking process. The humidity threshold is at the end of a second phase 60b.

By way of example the cooking phases may comprise:
60a heating of water on the food surface;
60b the start of evaporation of the food surface water;
60c the completion of surface water evaporation;
60d evaporation of water from food interior; and
60e weak evaporation due the completed drying of the food.

As another example, if the sensing (for cooking time determination) includes weight sensing, the time for the intervention may be set as a point in time at which a certain weight loss, e.g. 20%, has taken place. The weight may be monitored over time for this purpose.

By lifting the basket, the sensed weight drops to zero (if the basket weight is measured by sensor 30c) or drops by a generally known step (if the basket and cooking chamber weight is measured by sensor 30e). The weight monitoring itself may thus be used as the sensing mechanism for sensing the intervention.

Figure 5:
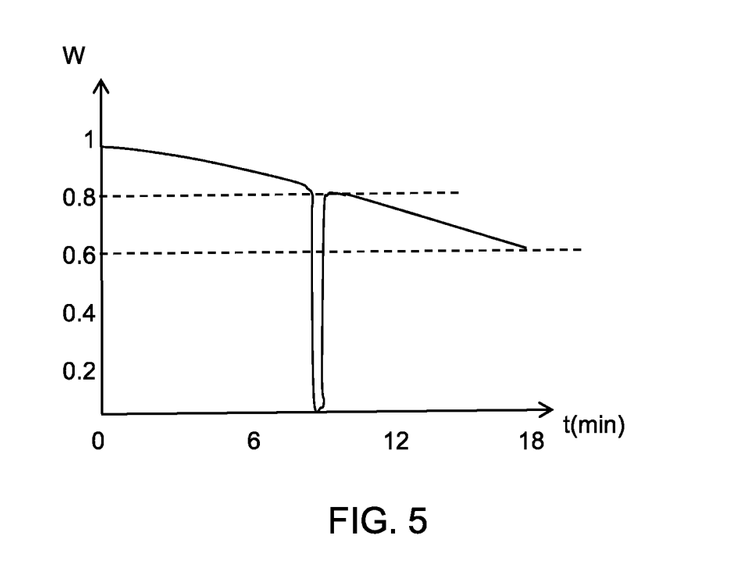
FIG. 5 shows the food weight (y-axis) over time during cooking.

FIG. 5 shows the food weight (y-axis, normalized to a starting weight of 1) over time (x-axis, minutes). It shows the weight dropping to zero at 9 minutes as a result of an intervention, when the weight has dropped to 80%. This is roughly half way through the cooking process.

As another example, if the sensing (for cooking time determination) includes image sensing, for example color monitoring, the time for the intervention may be set as a point in time at which a certain color change takes place, or a target color is reached. By lifting the basket, the sensed color changes to the facing wall of the cooking chamber rather the food item. The image sensing itself may thus be used as the sensing mechanism for sensing the intervention.

If the sensing (for cooking time determination) includes chamber temperature monitoring, the temperature sensing may be used as the sensing mechanism for sensing the intervention, based on a sudden drop in temperature, i.e. towards the ambient temperature.

Of course, the intervention may be sensed on dedicated sensors. For example, the sensor 50 may be a switch or proximity sensor.

Typically, a single intervention is sufficient, but the system may conceivably also advise the need for multiple interventions.

The time for an intervention is thus generally a function of the determined cooking time or a function of cooking parameters that are being monitored.

As explained above, when an intervention is sensed, the remaining cooking time is re-calculated. In this way, the doneness estimation does not need to be performed continuously. Instead, a first calculation is made, at the beginning of the cooking process, of the remaining cooking time. This calculation for example takes 30 seconds.

There may be user input relating to the type of food (e.g. fresh or frozen) which will influence the estimation. The food weight (e.g. an actual weight or just an indication of basket half full or full) may also be input to the cooking device, if there is not a weight sensor as part of the system.

A second calculation is then only performed once an intervention is detected. The intervention is likely to change the required cooking time particularly for a cooking device with a small cooking chamber, not much larger than the food support. An air fryer is an example of such a cooking device. It heats up quickly and has a small chamber. By way of example, the time for cooking fries may jump from 20 minutes to 25 minutes as a result of the intervention, in particular the as a result of the cooling of the cooking chamber which may take place for the 1 to 2 minutes while the basket is being shaken. By way of example, the cooking time may be extended by between 3 and 10 minutes, or by 10% to 30% of the overall cooking time.

However, the cooking time adjustment is not simply an added fixed time. Instead, it is based on a re-calculation of the remaining cooking time, for example requiring a further 30 second sampling of the sensed data to extrapolate a new point in time at which the cooking is complete.

If there are second or further interventions (whether instructed by the device or just sensed by the device) the remaining cooking time can again be re-calculated.

If an intervention is recommended by the cooking device but not sensed (e.g. the user had to go out so couldn't perform the ideal intervention), the cooking time does not need to be re-calculated.

As described above, the first aspect does not rely on any particular method of calculating doneness.

Figure 6:
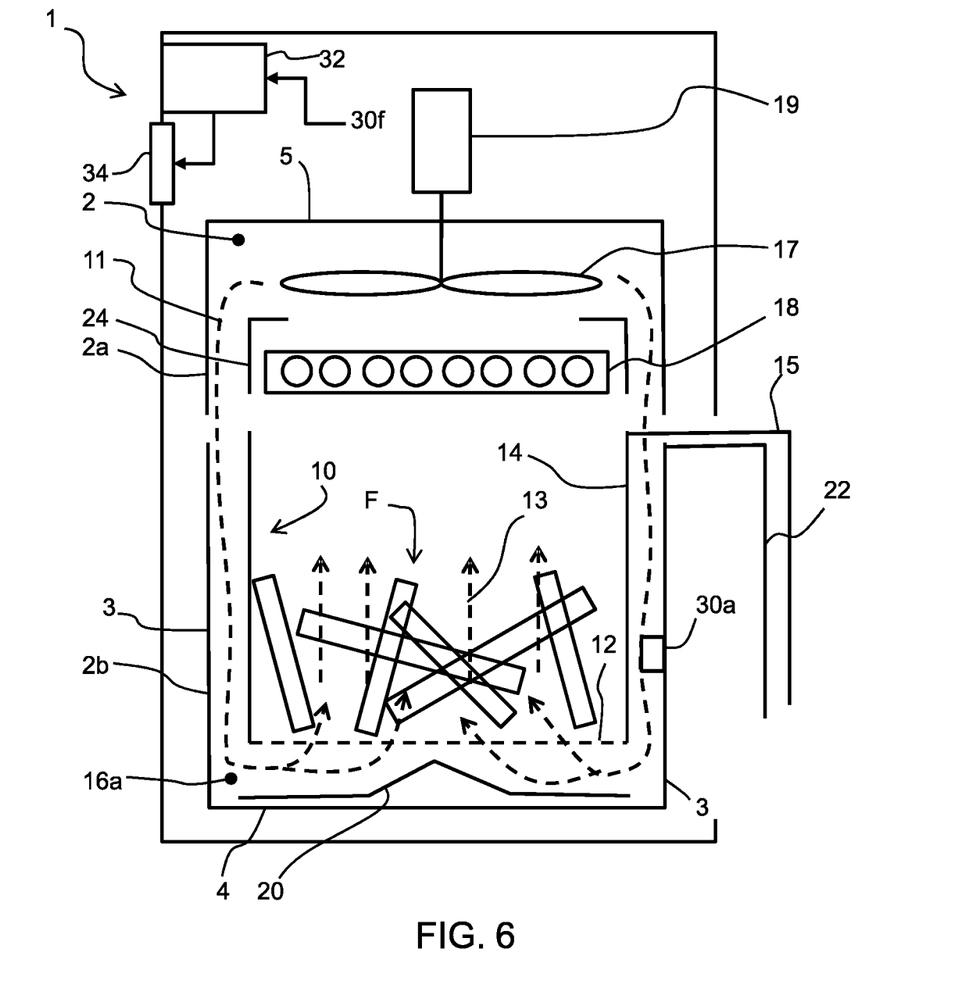
FIG. 6 shows a cooking device according to an example of the invention as a modification to the cooking device of FIG. 1.

FIG. 6 shows how the cooking device of FIG. 1 is modified in accordance with the invention. This aspect relates to the manner in which doneness and hence remaining cooking time are calculated.

The cooking device again comprises a sensing arrangement for sensing cooking parameters over time. However, estimates of the required cooking time are based only on the time-evolution of the cooking chamber temperature and a power of the heating device. Thus, there is a temperature sensor 30*a* in the cooking chamber (or a set of temperature sensors at multiple locations in the cooking chamber). This may again be the existing temperature sensor used for feedback control of the heating process, or there may be one or more additional dedicated sensors.

A controller 32, typically implemented as a microprocessor, is adapted to determine a required cooking time for the food to be cooked based on the time-evolution of the cooking temperature and the heating device power, which is represented as input 30*f*.

The heating device power may simply be a rated power of the heater (or a known power for different heating settings), which is known by the controller. The cooking device may instead comprise a power measurement system for measuring a power delivery of the heating device, for example by monitoring the current and voltage of the heater. This may be carried out only once during an initial period of heating, for example an average heating power during a period of e.g. 10 seconds within an initial time after the heater is first turned on (e.g. within the first 30 seconds). The average heating power may be derived after an initial settling period. The evolution of the heating power over time is for example not needed.

The heating power may be measured by monitoring the voltage and current locally at the heating device. However, the heating power may instead be derived from the total power consumption of the device (since the heating device provides a major and known contribution to the overall power consumption).

The function used to determine the cooking time is for example based on machine learning or else using equation-based modelling of the characteristics of the temperature-time function. Those equations may be generated based on machine-learning during a previous learning phase of development. Look up tables may again instead be used. The time-evolution of the cooking temperature is for example monitored over a measurement time period. From the data obtained, a function can be fitted to the data, and this can be extrapolated to the future. The function may for example represent the food core temperature, and a target core temperature corresponds to the completion of the cooking process. The function may be a linear approximation or a higher order function.

The controller 32 controls a panel 34 which functions as a user interface for receiving user commands and displaying output to the user.

The controller 32 is adapted to generate a first estimate of the required cooking time for a given food item to be cooked, after a first time period from the turning on of the heating device, wherein the first estimate is based only on the time-evolution of the cooking chamber temperature and a power of the heating device.

This first estimate may be given within 2 minutes, for example within 90 seconds or within one minute of the heating device being turned on. This assumes the cooking is not based on a preheated oven.

The controller later generates a second estimate of the required cooking time for the given food item. This assumes the cooking will be performed by a continuous i.e. non-user-interrupted cooking cycle. The second estimate is given after a second time period longer than the first time period. The second estimate is again based only on the time-evolution of the cooking chamber temperature and a power of the heating device.

This second estimate is given after the first, for example more than 2 minutes after the heating device is turned on, but for example less than 10 minutes, and preferably less than 5 minutes after the heating device is turned on.

The panel 34 is used to present the first and then second estimate to a user. The required cooking time is derived using a simple arrangement with only temperature changes over the cooking time being monitored. There is no need for weight sensing, humidity sensing or imaging sensing. There is also no need for food core temperature sensing.

The panel 34 is used for receiving from a user information relating to the type of the food item to be cooked and identifying the given food item to be cooked. Different time estimation algorithms may be used for different food types. The user information may involve a selection of both a food type and food status (e.g. fresh or frozen) but preferably as a single user selection (e.g. frozen chips is one option and fresh chips is another option). Thus, a single user selection may be all that is required.

As explained above, the purpose of the second estimate is to present more accurate information to the user. This is possible because a longer period of evolution of the cooking chamber temperature is available.

Additional measures are possible for increasing the accuracy of the second estimate.

Figure 7:
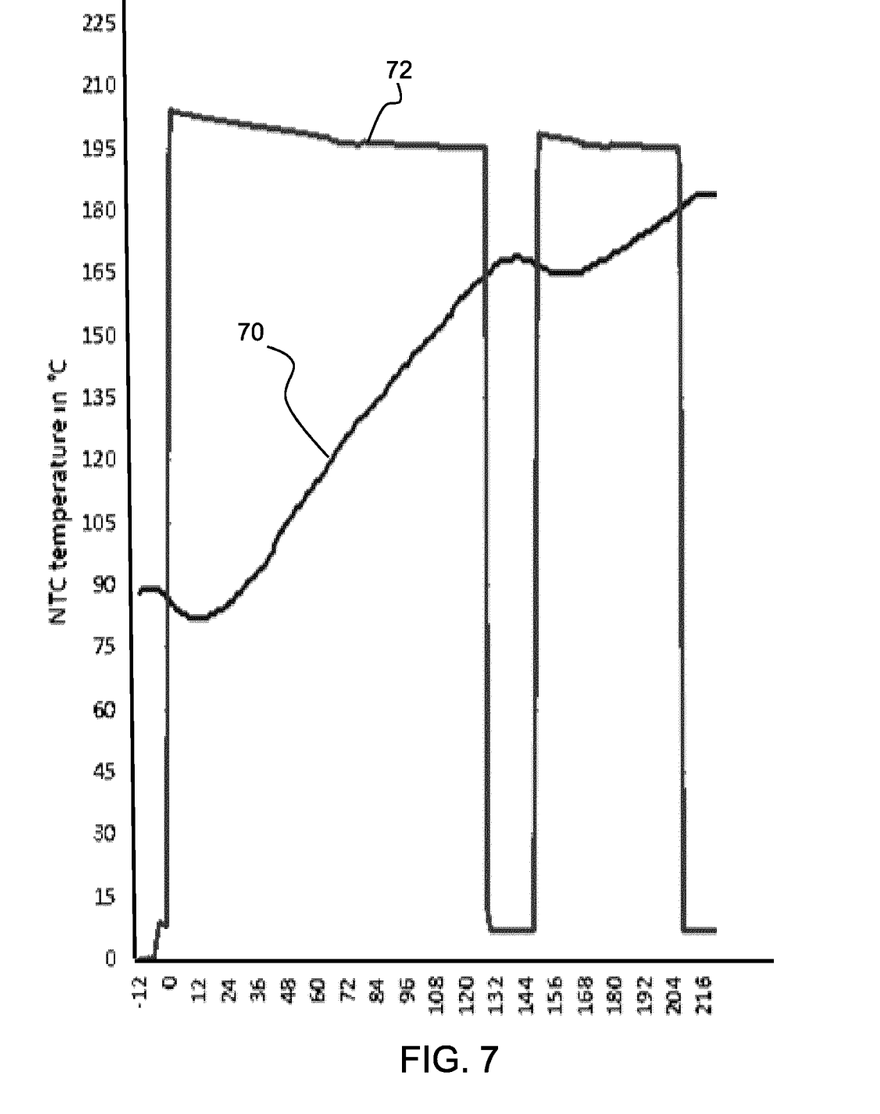
FIG. 7 shows how cooking chamber temperature may evolve over time, and also shows a heating interrupt period.

FIG. 7 shows a plot 70 of cooking chamber temperature versus time. The heating power is also shown as plot 72 (with no scale). The heating device is turned on at time zero. The chamber temperature initially drops, because cold or even frozen food has been put into the cooking chamber at time zero. The cooking chamber temperature drops to a minimum then increases. The shape of plot 70 represents the evolution of the cooking chamber temperature. Thus, any characteristics of the plot 70 (first derivatives, second derivatives, minima, maxima, time durations etc.) may be used as parameters for the remaining time estimation.

As explained above, these characteristics of the plot 70 may be used by a pre-trained machine learning classifier.

A machine-learning algorithm is any self-training algorithm that processes input data in order to produce or predict output data. Here, the input data comprises the temperature plot and the output data comprises a time estimation.

Suitable machine-learning algorithms for being employed in the present invention will be apparent to the skilled person. Examples of suitable machine-learning algorithms include decision tree algorithms and artificial neural networks. Other machine-learning algorithms such as logistic regression, support vector machines or Naïve Bayesian model are suitable alternatives.

The structure of an artificial neural network (or, simply, neural network) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

Methods of training a machine-learning algorithm are well known. Typically, such methods comprise obtaining a training dataset, comprising training input data entries and corresponding training output data entries. An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

For example, where the machine-learning algorithm is formed from a neural network, (weightings of) the mathematical operation of each neuron may be modified until the error converges. Known methods of modifying a neural network include gradient descent, backpropagation algorithms and so on.

The first estimate is for example provided between 30 seconds and 90 seconds after turning on the heating device.

In this example, the heating device output power is dropped to zero (or it could be changed to an intermediate heating power) when a temperature of 165 degrees is reached. It is turned off for an interrupt period of 20 seconds in this example (128s to 148s). The time-evolution of the temperature changes shape in this time, and this gives more information to the temperature estimation algorithm. It may for example enable a mass of the food being cooked to be taken into account more accurately. The mass of the food is the main factor contributing to cooking time.

The interrupt may be at a different temperature (e.g. 140 degrees, or anywhere between 120 and 190 degrees). It may instead be after a predefined heating time. The controller may additionally or alternatively change the speed of the fan 17 after a predefined heating time or when a predefined temperature is reached, for the interrupt period.

The estimates are based on the evolution of the cooking chamber temperature during the preceding time periods (including the interrupt period if one is used) and the heating device power delivery. The second estimate is more accurate at least because it make uses of time-evolution information over a longer time period. However, the use of the interrupt period may improve the accuracy further.

Note that when the interrupt period is designed into the cooking cycle, it is part of the "continuous cooking cycle" as defined above.

Figure 8:
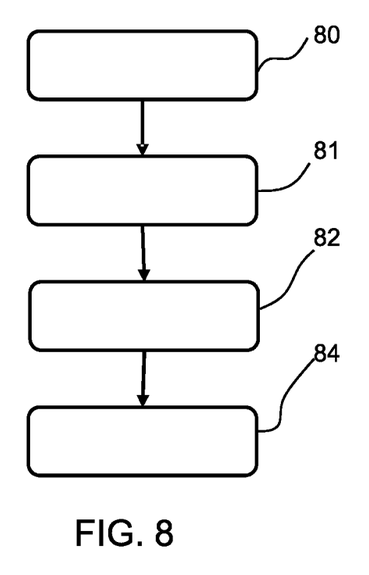
FIG. 8 shows a first cooking method.

FIG. 8 shows a first cooking method, comprising:
in step 80, a required cooking time is determined for food to be cooked based on the evolution of sensed cooking parameters over time;
in step 82, an intervention made by a user to the food during cooking is sensed; and
in step 84, the required cooking time is re-determined, based on the evolution of sensed cooking parameters over time, in response to a sensed intervention.

The required cooking time may be output to a user, and it may also be used to automatically control the cooking process. The method may further comprise, in step 81, instructing the user to perform the intervention by a visual and/or audible output. The example above is based on shaking the food item, such as shaking chips in a basket to provide better all-around cooking. However, the intervention may instead comprise flipping or turning the food item. For example, there may be food items which can be cooked on one side or on both sides according to a user's preference, and different cooking times may then be appropriate. The length of time taken by the user will also influence the required remaining cooking time. The food item may be mounted on a support such as a griddle or plate rather than being contained within a basket.

Thus, the type of intervention may depend on the type of cooking device. The device of the invention generally detects an intervention (and it may also provide an indication of when to perform the intervention) and then re-calculates cooking times, using an interpolation/extrapolation approach based on sensed cooking parameters.

Figure 9:
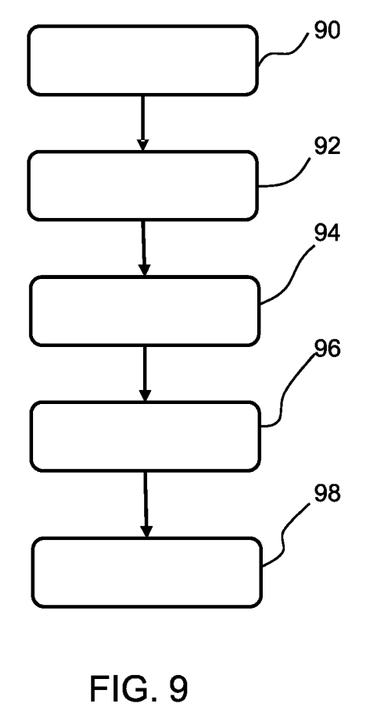
FIG. 9 shows a cooking method in accordance with the invention.

FIG. 9 shows a cooking method in accordance with the invention, comprising:
in step 90, sensing a cooking chamber temperature of a cooking device having a food support for supporting the food to be cooked mounted in the cooking chamber;
in step 92, generating a first estimate of the required cooking time for a given food item to be cooked, after a first time period from the turning on of the heating device, wherein the first estimate is based only on the time-evolution of the cooking chamber temperature and a power of the heating device;
in step 94 presenting the first estimate to a user.
in step 96, generating a second estimate of the required cooking time for the given food item to be cooked by a continuous cooking cycle, after a second time period longer than the first time period, wherein the second estimate is again based only on the time-evolution of the cooking chamber temperature and a power of the heating device; and
in step 98 presenting the second estimate to the user.

The two aspects above may be combined, so that the implementation of intervention detection may be applied with the remaining time estimation of the invention.

The methods may be implemented in part by software running on the controller. The system makes use of a controller for implementing the algorithm and for controlling the user interface and the cooking cycle. Components that may be employed for the controller include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. The term "adapted to" is used in the claims and description is intended to be equivalent to the term "configured to". Any reference signs in the claims should not be construed as limiting the scope.

The invention claimed is:

1. A cooking device, comprising:
   a cooking chamber;
   a food support, for supporting a food to be cooked, for mounting in the cooking chamber;
   a heating device for heating the cooking chamber;
   a sensing arrangement comprising a cooking chamber temperature sensor;
   an output device; and
   a controller adapted to:
   generate a first estimate of required cooking time for a given food item to be cooked, after a first time period from turning on of the heating device, wherein the first estimate is based on a time-evolution of a cooking chamber temperature and power delivered by the heating device, wherein the time-evolution is monitored over a measurement time period based on a correlation between a sensed cooking chamber temperature over the measurement time period and an estimated remaining cooking time;
   generate a second estimate of the required cooking time for the given food item to be cooked, by a continuous cooking cycle, after a second time period longer than the first time period, wherein the second estimate is based on the time-evolution of the cooking chamber temperature and the power delivered by the heating device; and
   control the output device to present the first estimate and the second estimate to a user.

2. The cooking device of claim 1, wherein the first time period is 90 seconds or less, and the second time period is 5 minutes or less.

3. The cooking device of claim 1, wherein the first estimate and the second estimate are cooking time estimates for the given continuous cooking cycle.

4. The cooking device of claim 1, further comprising a power measurement system for measuring a power delivery of the heating device.

5. The cooking device of claim 1, further comprising a user interface for receiving from the user, information relating to type of the food item to be cooked and identifying the given food item to be cooked.

6. The cooking device of claim 1, wherein the controller is further adapted to:
   change output power delivered by the heating device after a predefined heating time or when a predefined temperature is reached, for an interrupt period before generating the second estimate.

7. The cooking device of claim 6, wherein the controller is adapted to change the output power delivered by the heating device to zero for the interrupt period.

8. The cooking device of claim 1, further comprising a fan for circulating air in or through the cooking chamber, wherein the controller is further adapted to change fan speed after a predefined heating time or when a predefined temperature is reached, for an interrupt period before generating the second estimate.

9. The cooking device of claim 1, wherein the controller is adapted to:
   generate the first estimate based on the time-evolution of the cooking chamber temperature during the first time period and power delivery of the heating device; and
   generate the second estimate based on the time-evolution of the cooking chamber temperature during the second time period and the power delivery of the heating device.

10. The cooking device of claim 1, comprises an air fryer.

11. The cooking device of claim 1, further comprising:
    a sensor for sensing an intervention made by the user to the food during cooking, wherein the controller is adapted to:
    perform a further estimate of the required cooking time, in response to, and following, the sensed intervention; and/or
    implement a manual cooking mode if the sensed intervention is made by the user before the second estimate is made of the required cooking time.

12. The cooking device of claim 11, wherein the controller is adapted to implement an automatic cooking mode, with the required cooking time based on the second estimate.

13. A cooking method, comprising:
    sensing a cooking chamber temperature of a cooking device, having a food support for supporting food to be cooked mounted in a cooking chamber;
    generating a first estimate of required cooking time for a given food item to be cooked, after a first time period from turning on of a heating device, wherein the first estimate is based on a time-evolution of the cooking chamber temperature and power delivered by the heating device, wherein the time-evolution is monitored over a measurement time period based on a correlation between the sensed cooking chamber temperature over the measurement time period and an estimated remaining cooking time;

generating a second estimate of the required cooking time for the given food item to be cooked, by a continuous cooking cycle, after a second time period longer than the first time period, wherein the second estimate is based on the time-evolution of the cooking chamber temperature and the power delivered by the heating device; and presenting the first estimate and the second estimate to a user.

14. The cooking method of claim 13, comprising:

changing output power of the heating device after a predefined heating time or when a predefined temperature is reached, for an interrupt period before generating the second estimate; and/or changing a fan speed after the predefined heating time or when the predefined temperature is reached, for the interrupt period before generating the second estimate.

15. A computer program comprising code means which is adapted, when run on a computer, to perform the steps of claim 13 when controlling the cooking device of claim 12.

16. The cooking method of claim 13, further comprising estimating a core temperature of the food to be cooked based on the cooking chamber temperature.

* * * * *